United States Patent Office 3,816,445
Patented June 11, 1974

---

3,816,445
CERTAIN 2-SUBSTITUTED-Δ³-THIAZOLINES
Paul Dubs, Zug, and Mario Pesaro, Zurich, Switzerland, assignors to Givaudan Corporation, Clifton, N.J.
No Drawing. Filed June 26, 1972, Ser. No. 266,099
Claims priority, application Switzerland, June 30, 1971, 9,596/71
Int. Cl. C07d *91/24*
U.S. Cl. 260—306.7    7 Claims

ABSTRACT OF THE DISCLOSURE

Novel Δ³-thiazolines flavourants having the formula

wherein R is a $C_3$ to $C_7$ alkyl group, the benzyl group or the 2-methylthioethyl group, and a process for preparing the compounds.

FIELD OF THE INVENTION

This invention relates to the fields of flavourants and substituted thiazolines.

DESCRIPTION OF THE PRIOR ART

M. Thiel et al., *Liebigs Ann. Chem.*, 611, 121–131 (1958) describe the preparation of 2-alkyl-or-aryl-substituted Δ³-thiazolines. The literature, so far as we know, does not describe or suggest any organoleptic properties as being possessed by such products.

U. S. Pat. No. 2,879,273 discloses 2- and/or 4- and/or 5-substituted Δ³-thiazolines, and their use as flavourants.

SUMMARY OF THE INVENTION

The present invention relates to thiazolines. More particularly, the invention is concerned with Δ³-thiazolines and a process for the manufacture thereof. The invention is also concerned with flavouring compositions containing said Δ³-thiazolines and with a method of aromatizing foodstuffs utilizing said Δ³-thiazolines.

The Δ³-thiazolines provided by the present invention have the following general formula

   (I)

wherein R represents a $C_{3-7}$ alkyl group, the benzyl group or the 2-methylthioethyl group.

The aforementioned $C_{3-7}$ alkyl group can be straight-chain or branched-chain. Examples of such groups are the propyl, isopropyl, butyl, isobutyl, sec-butyl, pentyl and hexyl groups.

According to the process provided by the present invention, the Δ³-thiazolines of formula I hereinbefore are manufactured by reacting an aldehyde of the general formula

   (II)

wherein R has the significance given earlier,
with ammonia or an ammonium salt and α-mercaptoacetaldehyde.

Examples of ammonium salts are ammonium salts of mineral acids (e.g. hydrohalic acids such as hydrochloric acid, hydrobromic acid or hydriodic acid, sulphuric acid, nitric acid, etc.). The α-mercaptoacetaldehyde can also be generated in situ from suitable precursors such as, for example, from the dimer (bis-mercaptoacetaldehyde) or also from other α-substituted acetaldehydes such as, for example, α-haloacetaldehydes, by reaction with, for example, sodium hydrogen sulphide.

DESCRIPTION OF THE PREFERRED EMBODIMENTS

The reaction of the starting materials of the present process can be carried out in the presence or absence of a solvent. Examples of solvents which may be used are alcohols (e.g. alkanols such as methanol, ethanol, etc.), ethers (e.g. diethyl ether, diisopropyl ether, dioxan, tetrahydrofuran, etc.), aliphatic or aromatic hydrocarbons (e.g. pentane, hexane, benzene, toluene, etc.), secondary and tertiary amines (e.g. diethylamine, triethylamine etc.), amides (e.g. dimethylformamide, etc.), water, or also liquid ammonia. A preferred solvent is diethyl ether.

The molar ratio of an aldehyde of formula II to the α-mercaptoacetaldehyde expediently amounts to 1:1, but either of the two reactants can also be used in excess; for example in the proportion 2:1.

The ammonia can be used in arbitrary amounts, but it is recommended to use an excess thereof with respect to the aldehyde of formula II and α-mercaptoacetaldehyde. According to a preferred embodiment of the process, gaseous ammonia is passed through the reaction mixture containing the aldehyde of formula II, α-mercaptoacetaldehyde and solvent.

The reaction can be carried out in the presence or absence of a water-removing agent. If the reaction is carried out in an organic solvent, anhydrous sodium sulphate is expediently used as the water-removing agent.

The reaction is expediently carried out at a temperature between about −30° C. and 100° C. A preferred temperature range is between about 0° C. and 40° C., the mixture expediently being heated somewhat more strongly (e.g. to 60° C.) towards the end of the reaction. The reaction time amounts to between 5 minutes and 24 hours depending on the reaction temperature, preferably about 10 to 30 minutes at room temperature.

The isolation of the reaction product can be carried out according to methods known per se; for example, by filtering off the sodium sulphate which may be present and fractionally distilling the filtrate.

The Δ³-thiazolines of formula I provided by the present invention possess particular aroma properties. In particular, they display interesting vegetable notes such as bean, tomato, pepperoni, asparagus as well as potato notes. Thus, for example, 2-isobutyl-Δ³-thiazoline is distinguished by a typical bean-like fragrance with a weak pepperoni note. If 1 p.p.m. of this Δ³-thiazoline is added to a 1% sodium chloride solution, the resulting solution tastes typically of fresh green beans. If, on the other hand, the aforementioned Δ³-thiazoline is added to a bean soup (prepared from commercially available ready-mixed packet soup), the original bean note is substantially improved and especially the aroma of fresh green beans comes distinctly into play.

The Δ³-thiazolines of formula I can accordingly be used for aromatizing foodstuffs (e.g. soups, vegetables, sauces, etc). The pronounced flavor qualities of the Δ³-thiazolines of formula I enables them to be used for this purpose in small concentrations (e.g. in the range of 0.01–10 p.p.m., preferably 0.1–1 p.p.m.) in the finished product.

The Δ³-thiazolines of formula I can be mixed, optionally with other flavor-imparting ingredients, with the usual carrier materials and/or diluents and, if desired, emulsifiers to provide aromatizing agents which impart to foodstuffs a vegetable flavour or reinforce such a flavour. The Δ³-thiazolines of formula I can be added to the products to be aromatized in the form just described or can also be added alone. In this case, particular attention must be paid in carrying out the addition that the $\Delta^3$-thiazoline is evenly distributed in the product to be aromatized. When the $\Delta^3$-thiazolines are used as components for the preparation of artificial aromas, these aromas can be formulated, for example, into liquids, pastes or powders. The products can, for example, be spray-dried, vacuum-dried or lyophilised. The formulation of such artificial aromas as well as the aromatization of foodstuffs can, in other respects, be carried out in a manner known per se [see J. Merory; Food flavourings, composition, manufacture and use; Avi Publ. Co. Inc. Westport (1968)].

The following examples illustrate the process provided by the present invention without however being limitative thereof.

Example 1

Ammonia gas was slowly introduced at 20° C. for 20 minutes with stirring into a mixture of 52 g. of dimeric α-mercaptoacetaldehyde [M. Thiel, F. Asinger, K. Schmiedel, Ann., 611, 126 (1958)], 97 g. of isovaleraldehyde, 30 g. of anhydrous sodium sulphate and 200 ml. of ether. The reaction mixture was thereafter heated to 60° C. and ammonia gas was passed through for a further 10 minutes. The mixture was filtered off from the sodium sulphate, washed twice with 20 ml. of ether each time and the solvent was distilled off at normal pressure via a column. By fractional distillation of the residue via a Vigreux column there were obtained 53.5 g. (55% yield based on α-mercaptoacetaldehyde) of gas-chromatographically uniform 2-isobutyl-$\Delta^3$-thiazoline, B.P.$_8$ 73°–74° C.; $n_D^{20}=1.4956$; IR (liq.): bands, among others, at 1640 and 1465 cm.$^{-1}$.

The foregoing $\Delta^3$-thiazoline displays a bean-like, green, weakly fatty fragrance reminiscent of pepperoni as well as turnips, as well as a somewhat tarry, earthy, pepperoni-like, green, bean-like flavour.

Example 2

By reacting 52 g. of dimeric α-mercaptoacetaldehyde with 97 g. of racemic 2-methylbutyraldehyde in accordance with the procedure described in Example 1 there were obtained 69.2 g. (72% yield based on α-mercaptoacetaldehyde) of a mixture of the two disastereomeric enantiomer pairs of 2-sec-butyl-$\Delta^3$-thiazoline (gas-chromatographically determined ratio: ca. 4:1), B.P.$_9$ 74°–76° C.; $n_D^{20}=1.4943$; IR (liq.): bands, among others, at 1650 and 1460 cm.$^{-1}$.

This $\Delta^3$-thiazoline displays a green-mouldy, potato-like fragrance in the direction of fresh beans and turnips and a green flavour in the direction of tomato-asparagus and fried potatoes.

Example 3

By reacting 52 g. of dimeric α-mercaptoacetaldehyde with 81.5 g. of isobutyraldehyde in accordance with the procedure described in Example 1 there were obtained 50.1 g. (57% yield based on α-mercaptoacetaldehyde) of 2-isopropyl-$\Delta^3$-thiazoline, B.P.$_9$ 60°–63° C.;

$$n_D^{20}=1.4991;$$

IR (liq.): bands, among others, at 1650 and 1470 cm.$^{-1}$.

This $\Delta^3$-thiazoline displays a pyridine-like, sulphurous-metallic, green, weak, solvent-like fragrance and a tarry, nut-like flavour in the direction of burnt potatoes.

Example 4

By reacting 52 g. of dimeric α-mercaptoacetaldehyde with 120 g. of 3-methylthiopropionaldehyde (methional) in accordance with the procedure described in Example 1 there were obtained 65.8 g. (60% yield based on α-mercaptoacetaldehyde) of 2-(2-methylthioethyl)-$\Delta^3$-thiazoline, B.P.$_{0.4}$ 95°–96° C.; $n_D^{20}=1.5642$; IR (liq.): bands, among others, at 1645, 1430 and 1225 cm.$^{-1}$.

This $\Delta^3$-thiazoline displays a methional-like, earthy, green, metallic fragrance in the direction of raw potatoes and mushrooms and a greenish flavour in the direction of potatoes, tomatoes, beans and mushrooms.

Example 5

By reacting 52 g. of dimeric α-mercaptoacetaldehyde with 135 g. of phenylacetaldehyde in accordance with the procedure described in Example 1 there were obtained 20.6 g. (17% yield based on α-mercaptoacetaldehyde) of 2-benzyl-$\Delta^3$-thiazoline, B.P.$_{0.1}$ 165°–170° C.;

$$n_D^{20}=1.6015;$$

IR (liq.)] bands, among others, at 1640, 1600, 1495 and 1450 cm.$^{-1}$.

This $\Delta^3$-thiazoline displays a sweetish, flowery, faint honey-like, earthy, greenish, mushroom-like fragrance and a honey-like, somewhat flowery, earthy flavour.

Example 6

By reacting 43.8 g. of dimeric α-mercaptoacetaldehyde with 95.2 g. of hexanal in accordance with the procedure described in Example 1 there were obtained 61.3 g. (68% yield based on α-mercaptoacetaldehyde) of 2 - n-pentyl-$\Delta^3$-thiazoline, B.P.$_5$ 96°–97° C.; $n_D^{20}=1.4945$; IR (liq.): bands, among others, at 1645, 1470 and 1220 cm.$^{-1}$.

This $\Delta^3$-thiazoline displays a green, leguminous-like fragrance and a honey-like, pea-like, sulphurous flavour.

Example 7

By reacting 43.8 g. of dimeric α-mercaptoacetaldehyde with 106.1 g. of heptanal in accordance with the procedure described in Example 1 there were obtained 54.28 g. (55% yield based on α-mercaptoacetaldehyde) of 2-n-hexyl-$\Delta^3$-thiazoline, B.P.$_{0.07}$ 84° C.; $n_D^{20}=1.4928$; IR (liq.): bands, among others, at 1650, 1470 and 1225 cm.$^{-1}$.

This $\Delta^3$-thiazoline displays a green, leguminous-like, faint pepperoni-like fragrance and a green, fatty, aldehyde-like flavour reminiscent of green beans.

Example 8

By reacting 52 g. of dimeric α-mercaptoacetaldehyde with 79.2 g. of n-butyraldehyde in accordance with the procedure described in Example 1 there were obtained 70.1 g. (80% yield based on α-mercaptoacetaldehyde) of 2-n-propyl-$\Delta^3$-thiazoline, B.P.$_6$ 70° C.; $n_D^{20}=1.5031$; IR (liq.): bands, among others, at 1645, 1465 and 1230 cm.$^{-1}$.

This $\Delta^3$-thiazoline displays an intensive green, vegetable-like (beans, peas) fragrance faintly reminiscent of hexanal and a greenish, peanut-like flavour.

Example 9

By reacting 52 g. of dimeric α-mercaptoacetaldehyde with 97 g. of n-valeraldehyde in accordance with the procedure described in Example 1 there were obtained 80.9 g. (83% yield based on α-mercaptoacetaldehyde) of 2-n-butyl-$\Delta^3$-thiazoline, B.P. 84°–85° C.; $n_D^{20}=1.4968$; IR (liq.): bands, among others, at 1645, 1465 and 1220 cm.$^{-1}$.

This $\Delta^3$-thiazoline displays a green, somewhat earthy, carrot-like, faint leguminous-like fragrance and a greenish, earthy, potato-like flavour.

The following Examples illustrate flavouring compositions containing the $\Delta^3$-thiazoline derivatives provided by the present invention:

EXAMPLE A.—FLAVOURING COMPOSITION (POTATO TYPE)

| Ingredients | A | B |
| --- | --- | --- |
| Vanillin | 2.0 | 2.0 |
| Diacetyl | 3.0 | 3.0 |
| Butryric acid | 3.0 | 3.0 |
| Acetylmethylcarbinol | 5.0 | 5.0 |
| Methional | 60.0 | 20.0 |
| 2-(2-methylthioethyl)-$\Delta^3$-thiazoline | | 40.0 |
| Alcohol | 927.0 | 927.0 |
| Total | 1,000.0 | 1,000.0 |

By the partial replacement of methional in composition A by 2-(2-methylthioethyl)-Δ³-thiazoline, a typical "fried potato note" is produced (composition B).

EXAMPLE B.—FLAVOURING COMPOSITION (TOMATO TYPE)

| Ingredients | A | B |
| --- | --- | --- |
| Acetaldehyde | 2.0 | 2.0 |
| i-Valeric acid | 2.0 | 2.0 |
| Caprylic acid | 2.0 | 2.0 |
| Benzaldehyde | 3.0 | 3.0 |
| i-Valeraldehyde | 3.0 | 3.0 |
| Butyric acid | 3.0 | 3.0 |
| Propionic acid | 3.0 | 3.0 |
| Vanillin | 3.0 | 3.0 |
| Phenylacetaldehyde | 5.0 | 5.0 |
| Linalool | 5.0 | 5.0 |
| Dimethylsulphide (1%) | 10.0 | 10.0 |
| Terpinylbutyrate | 10.0 | 10.0 |
| Cis-3-hexenol | 60.0 | 60.0 |
| Phenylacetic acid guiacyl ester | 150.0 | 150.0 |
| Methional | 150.0 | 125.0 |
| 2-(2-methylthioethyl)-Δ³-thiazoline | | 25.0 |
| Methylheptenone | 270.0 | 270.0 |
| Caproaldehyde | 319.0 | 319.0 |
| Total | 1,000.0 | 1,000.0 |

By the partial replacement of methional in composition A by 2-(2-methylthioethyl)-Δ³-thiazoline the green tomato note is considerably reinforced.

What we claim is:
1. 2-sec-Butyl-Δ³-thiazoline.
2. 2-Butyl-Δ³-thiazoline.
3. 2-Isobutyl-Δ³-thiazoline.
4. 2-Pentyl-Δ³-thiazoline.
5. 2-Hexyl-Δ³-thiazoline.
6. 2-(2-Methylthioethyl)-Δ³-thiazoline.
7. 2-Benzyl-Δ³-thiazoline.

References Cited

UNITED STATES PATENTS

| | | | |
| --- | --- | --- | --- |
| 2,879,273 | 3/1956 | Asinger et al. | 260—306.7 |
| 3,700,683 | 10/1972 | Asinger et al. | 260—306.7 |
| 3,681,088 | 8/1972 | Katz et al. | 260—306.7 |
| 3,678,064 | 7/1972 | Copler et al. | 260—306.7 |

OTHER REFERENCES

Thiel et al., Chem. Abstracts, 53:17104–5 (1959).

RICHARD J. GALLAGHER, Primary Examiner

U.S. Cl. X.R.

99—140